US012602647B2

(12) United States Patent
Gupta et al.

(10) Patent No.: US 12,602,647 B2
(45) Date of Patent: Apr. 14, 2026

(54) EFFICIENT SAME DAY PACKAGE RETURN ROUTING WITH DISTRIBUTED FLEET

(71) Applicant: DoorDash, Inc., San Francisco, CA (US)

(72) Inventors: Gagan Gupta, San Francisco, CA (US); Viraj Bindra, San Francisco, CA (US); Larry Waldman, San Francisco, CA (US); Rajat Shroff, Redwood Shores, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 18/345,179

(22) Filed: Jun. 30, 2023

(65) Prior Publication Data

US 2024/0005265 A1 Jan. 4, 2024

Related U.S. Application Data

(60) Provisional application No. 63/357,437, filed on Jun. 30, 2022.

(51) Int. Cl.
*G06Q 10/083* (2024.01)
*G06Q 10/0834* (2023.01)
*G06Q 10/0837* (2023.01)

(52) U.S. Cl.
CPC . *G06Q 10/08355* (2013.01); *G06Q 10/08345* (2013.01); *G06Q 10/0837* (2013.01)

(58) Field of Classification Search
CPC ....... G06Q 10/08355; G06Q 10/08345; G06Q 10/0837
See application file for complete search history.

(56) References Cited

U.S. PATENT DOCUMENTS 6,384,850 B1 5/2002 Mcnally et al.
6,871,325 B1 3/2005 Mcnally et al.
(Continued)

FOREIGN PATENT DOCUMENTS

WO 0068856 A2 11/2000
WO 0122289 A1 3/2001
WO 2021087351 A1 5/2021

OTHER PUBLICATIONS

M. T. Muslu and Y. Doğan, "Improved Genetic Algorithm and Mobile Application for an Up-to-date Traveling Salesman Problem," 2020 4th International Symposium on Multidisciplinary Studies and Innovative Technologies (ISMSIT), Istanbul, Turkey, 2020, pp. 1-7, doi: 10.1109/ISMSIT50672.2020.9255207. (Year: 2020).*
(Continued)

*Primary Examiner* — George Chen
*Assistant Examiner* — Danielle Elizabeth Zevitz
(74) *Attorney, Agent, or Firm* — Kilpatrick Townsend & Stockton LLP

(57) ABSTRACT

A method includes a server computer receiving data relating to a plurality of delivery orders from service providers to end users, and data relating to a plurality of delivery orders from end users to service providers. The server computer determines a plurality of routes corresponding to the plurality of delivery orders. The server computer can then determine a set of optimal route plans by combining delivery order routes. The server computer can then receive acceptances from a plurality of transporters that will execute the set of optimal route plans. The server computer can then facilitate execution of the optimal route plans.

15 Claims, 7 Drawing Sheets

(56) References Cited

U.S. PATENT DOCUMENTS

| | | | |
|---|---|---|---|
| 6,982,733 | B1 | 1/2006 | Mcnally et al. |
| 7,653,457 | B2 | 1/2010 | Bloom |
| 8,146,077 | B2 | 3/2012 | Mcnally et al. |
| 8,219,463 | B2 | 7/2012 | Dearlove et al. |
| 8,417,574 | B2 | 4/2013 | Chalmers et al. |
| 9,009,060 | B2 | 4/2015 | Mcnally |
| 9,286,591 | B2 | 3/2016 | Lehner et al. |
| 9,747,651 | B2 | 8/2017 | Mcnally |
| 10,162,685 | B2 | 12/2018 | Ristock et al. |
| 10,318,914 | B1* | 6/2019 | Arora .............. G06Q 10/08355 |
| 10,970,797 | B2 | 4/2021 | Mcnally |
| 11,276,130 | B2 | 3/2022 | Mcnally |
| 11,842,415 | B2 | 12/2023 | Mcnally |
| 11,847,587 | B1 | 12/2023 | Mcnally |
| 12,293,425 | B1* | 5/2025 | McNally ............ G06Q 30/0643 |
| 12,327,217 | B2 | 6/2025 | Gupta et al. |
| 2002/0128915 | A1 | 9/2002 | Haseltine |
| 2005/0114221 | A1 | 5/2005 | Walters et al. |
| 2006/0149577 | A1 | 7/2006 | Stashluk, Jr. et al. |
| 2010/0131420 | A1 | 5/2010 | Williams et al. |
| 2010/0325698 | A1 | 12/2010 | Ginter et al. |
| 2011/0251990 | A1* | 10/2011 | Yarvis ................... G06Q 30/02 |
| | | | 706/46 |
| 2013/0173490 | A1 | 7/2013 | Shroff et al. |
| 2014/0229338 | A1 | 8/2014 | Borders et al. |
| 2014/0249937 | A1 | 9/2014 | Mcnally |
| 2015/0154559 | A1 | 6/2015 | Barbush et al. |
| 2015/0294265 | A1 | 10/2015 | Monteverde |
| 2015/0310387 | A1 | 10/2015 | Friedman et al. |
| 2016/0098669 | A9 | 4/2016 | Kantarjiev et al. |
| 2016/0104112 | A1* | 4/2016 | Gorlin ..................... G06F 16/29 |
| | | | 705/338 |
| 2016/0349067 | A1 | 12/2016 | Fowe |
| 2017/0323545 | A1 | 11/2017 | Gillen et al. |
| 2018/0075407 | A1 | 3/2018 | Chivukula |
| 2018/0082252 | A1 | 3/2018 | Wilkinson et al. |
| 2018/0107977 | A1 | 4/2018 | McHale et al. |
| 2018/0276739 | A1 | 9/2018 | Chopp |
| 2019/0005449 | A1 | 1/2019 | Smith et al. |
| 2019/0073631 | A1 | 3/2019 | Ferguson et al. |
| 2019/0220273 | A1 | 7/2019 | Ye et al. |
| 2019/0228377 | A1* | 7/2019 | Pande .............. G06Q 10/06315 |
| 2019/0367278 | A1* | 12/2019 | Bellar .................... G06Q 10/08 |
| 2020/0074526 | A1 | 3/2020 | Bikumala et al. |
| 2020/0082334 | A1 | 3/2020 | Dotterweich et al. |
| 2020/0193371 | A1 | 6/2020 | Jean-Charles |
| 2021/0256472 | A1* | 8/2021 | Javidan ................... H04W 4/12 |
| 2022/0083969 | A1 | 3/2022 | Deluca et al. |
| 2022/0092535 | A1 | 3/2022 | Silverstein et al. |
| 2022/0147927 | A1 | 5/2022 | Kieboom et al. |
| 2022/0230135 | A1 | 7/2022 | Burris et al. |
| 2022/0270040 | A1 | 8/2022 | Kieboom et al. |
| 2023/0004709 | A1 | 1/2023 | Spirig et al. |
| 2023/0245037 | A1 | 8/2023 | Zhao et al. |
| 2023/0281690 | A1 | 9/2023 | Fort et al. |
| 2024/0005265 | A1 | 1/2024 | Gupta et al. |
| 2024/0005334 | A1 | 1/2024 | Gupta et al. |
| 2025/0265540 | A1 | 8/2025 | Gupta et al. |

OTHER PUBLICATIONS

"Civil Action No. 2:23-CV-2165-WSH", Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

U.S. Appl. No. 18/345,528 , Non-Final Office Action, Mailed on Jul. 2, 2025, 27 pages.

U.S. Appl. No. 18/345,969 , Final Office Action, Mailed on Oct. 21, 2024, 29 pages.

U.S. Appl. No. 18/345,969 , Non-Final Office Action, Mailed on Mar. 14, 2024, 30 pages.

U.S. Appl. No. 18/345,969 , Notice of Allowance, Mailed on Feb. 12, 2025, 14 pages.

Tu et al., "OCD: Online Crowdsourced Delivery for On-Demand Food", Institute of Electrical and Electronics Engineers Internet of Things Journal, vol. 7, No. 8, Aug. 2020, pp. 6842-6854.

U.S. Appl. No. 18/345,528 , Notice of Allowance, Mailed on Dec. 2, 2025, 12 pages.

\* cited by examiner

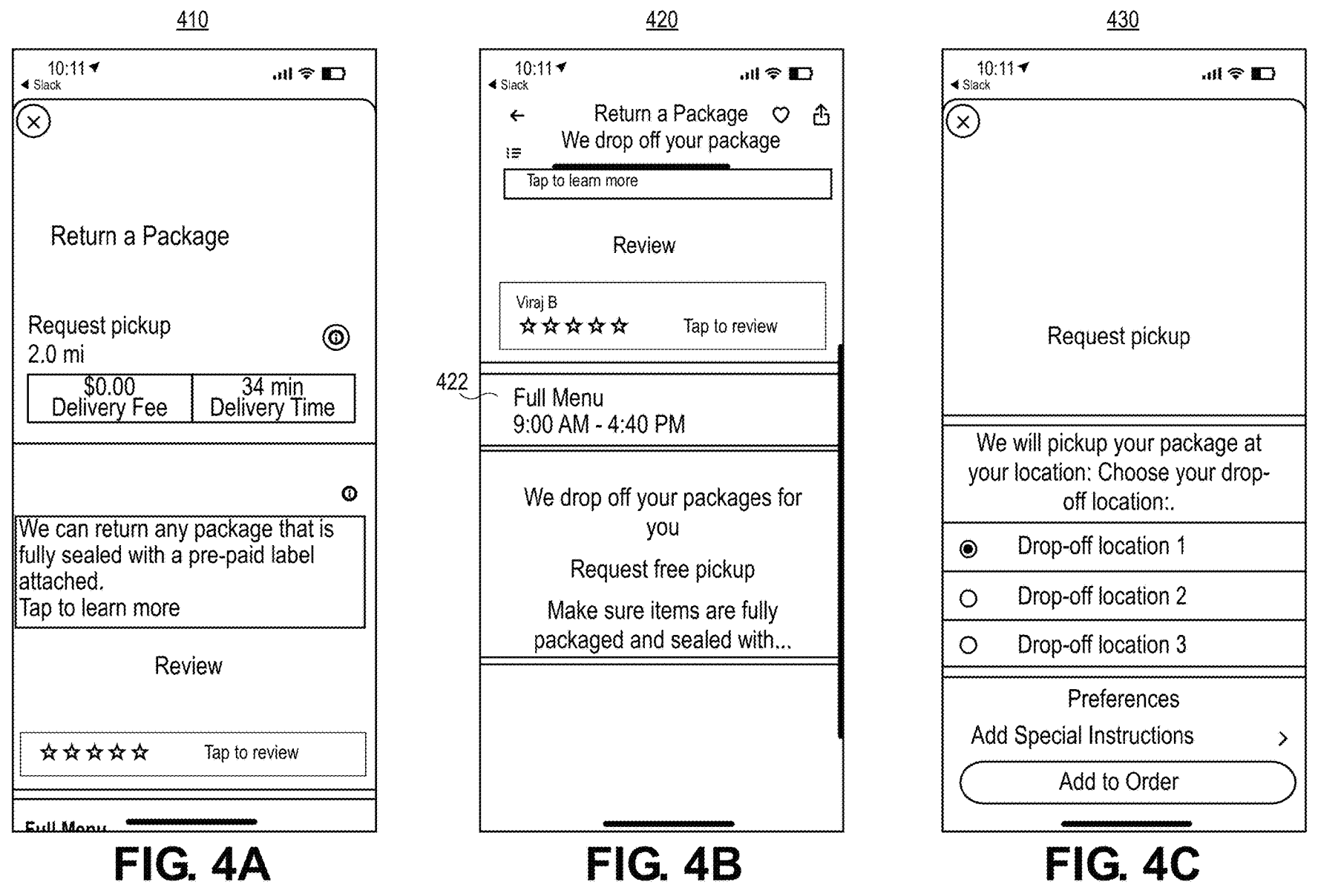

430

10:11
▲ Slack

Request pickup

We will pickup your package at your location: Choose your drop-off location:.

◉ Drop-off location 1

○ Drop-off location 2

○ Drop-off location 3

Preferences

Add Special Instructions                    ⌄

( Add to Order )

10:11
▲ Slack

← Return a Package    ♡    ⎙
We drop off your package

Tap to learn more

Review

Viraj B
☆ ☆ ☆ ☆          Tap to review

422 —

Full Menu
9:00 AM - 4:40 PM

We drop off your packages for you

Request free pickup

Make sure items are fully packaged and sealed with...

10:11
▲ Slack

Return a Package                    ◎

Request pickup
2.0 mi $0.00          34 min
Delivery Fee   Delivery Time

⊙

We can return any package that is fully sealed with a pre-paid label attached.
Tap to learn more Review ☆ ☆ ☆ ☆          Tap to review Full Menu

FIG. 4A

EFFICIENT SAME DAY PACKAGE RETURN ROUTING WITH DISTRIBUTED FLEET

CROSS-REFERENCES TO RELATED APPLICATIONS

This application claims the benefit of U.S. Provisional Application No. 63/357,437, filed Jun. 30, 2022, which is herein incorporated by reference in its entirety for all purposes.

SUMMARY

One embodiment is related to a method comprising: receiving, by a server computer, data relating to a first plurality of delivery orders from first service providers to first end users, and data relating to a second plurality of delivery orders from second end users to second service providers; determining, by the server computer, a first plurality of routes corresponding to the first plurality of delivery orders from the first service providers to the first end users; determining, by the server computer, a second plurality of routes corresponding to the second plurality of end users to the second service providers; determining, by the server computer, a set of optimal route plans by combining one or more of the first plurality of routes and one or more of the second plurality of routes; receiving, by the server computer, acceptances from one or more transporters that will execute the set of optimal route plans; and facilitating, by the server computer, execution of the set of optimal route plans.

Another embodiment is related to a server computer comprising: a processor; and a computer-readable medium coupled to the processor, the computer-readable medium comprising code executable by the processor for implementing a method comprising: receiving data relating to a first plurality of delivery orders from first service providers to first end users, and data relating to a second plurality of delivery orders from second end users to second service providers; determining a first plurality of routes corresponding to the first plurality of delivery orders from the first service providers to the first end users; determining a second plurality of routes corresponding to the second plurality of end users to the second service providers; determining a set of optimal route plans by combining one or more of the first plurality of routes and one or more of the second plurality of routes; receiving acceptances from one or more transporters that will execute the set of optimal route plans; and facilitating, by the server computer, execution of the set of optimal route plans.

Another embodiment is related to a method comprising: accessing, by a transporter user device, a delivery platform that includes a set of optimal route plans from a central server computer; selecting, by the transporter user device, an optimal route plan of the set of optimal route plans; providing, by the transporter user device, an acceptance of the optimal route plan that indicates that a transporter of the transporter user device is to execute the optimal route plan; and notifying, by the transporter user device, the central server computer of progress of the transporter along the optimal route plan.

Further details regarding embodiments of the disclosure can be found in the Detailed Description and the Figures.

BRIEF DESCRIPTION OF THE DRAWINGS

FIGS. 4A, 4B, and 4C show user interfaces of a user device according to embodiments.

DETAILED DESCRIPTION

Figure 1:
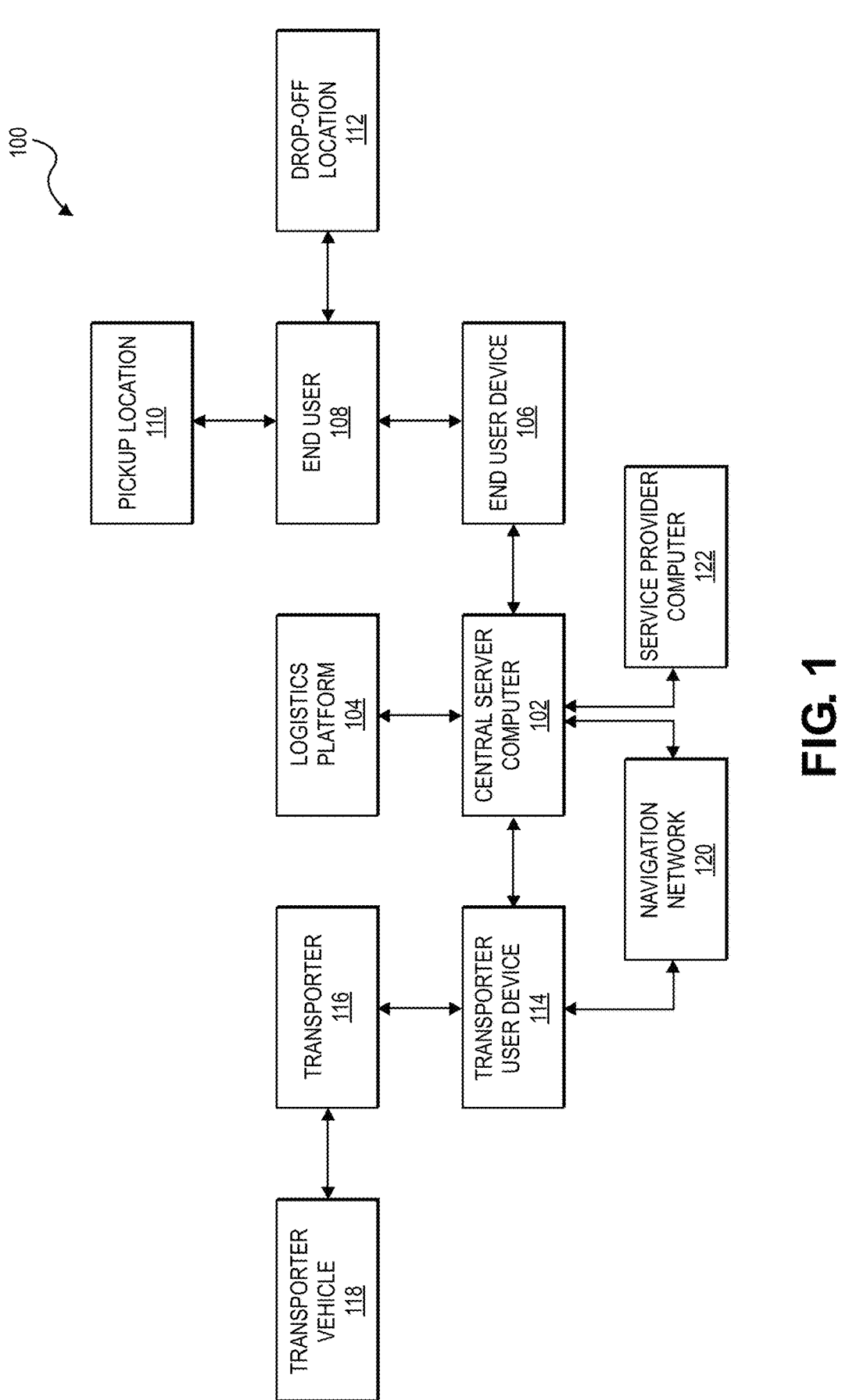
FIG. 1 shows a block diagram illustrating a system according to embodiments.

Prior to discussing embodiments of the disclosure, some terms can be described in further detail.

An "item" can be an individual article or unit. Examples of items can include perishable items such as food items, beauty items (e.g., cosmetics), office supply products (e.g., staples, paper, and ink), hardware items (e.g., nails, hammers, wrenches), electronic devices (e.g., computers, phones, etc.), jewelry, etc.

A "user" may include an individual or a computational device. In some embodiments, a user may be associated with one or more personal accounts and/or mobile devices. In some embodiments, the user may be a consumer or a customer.

A "user device" may be a device that is operated by a user. In some embodiments, the user device can be an electronic device that can process information and communicate with other electronic devices. A user device may include a processor and a computer-readable medium coupled to the processor, the computer-readable medium comprising code, executable by the processor. Examples of user devices may include a mobile device, a laptop or desktop computer, a wearable device, etc.

A "transporter" can be an entity that transports something. A transporter can be a person that transports an item using a transportation device (e.g., a car). In other embodiments, a transporter can be a transportation device that may or may not be operated by a human. Examples of transportation devices include cars, boats, scooters, bicycles, drones, airplanes, etc. In some embodiments, the user device can be integrated into a transportation device.

A "fulfillment request" can be a request to provide a resource in response to a request. For example, a fulfillment request can include an initial communication from an end user device to a central server computer for a first service provider computer to fulfill a purchase request for a resource such as food. A fulfillment request can be in an initial state, a completed state, or a final state. A fulfillment request can include one or more selected items that a user wishes to obtain from a selected service provider.

A "delivery order" can include a request to deliver one or more items. Delivery orders can include requests to provide one or more items from a pickup location to a drop-off location. Delivery orders can include orders to deliver items from service provider locations to end user locations. Delivery orders can include orders to deliver items from end user locations to service provider locations. An example of this type of delivery order can be a return order (e.g., to deliver an item that is to be returned). A delivery order can include data to fulfill the delivery request including an order type, an indication of an item, a pickup location, and a drop-off location. In some embodiments, the delivery order can include a scheduling range by which the order is to be fulfilled. A delivery order can also include metadata. The metadata can include data relating to the delivery order (e.g., related order numbers, instruction data, etc.).

A "route" can include a way or course taken in getting from a starting point to a destination. For example, a route can indicate a path that can be followed to move from a pickup location to a drop-off location. In some embodiments, a route can indicate a suggested path that a transporter can follow to deliver an item from a service provider to an end user (or vice-versa) for a delivery order.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Many delivery systems exist today. However, as the number of delivery orders for the delivery of items from location to location has increased over time, the number of journeys that transporters undertakes have also increased. Embodiments provide systems and methods to improve the efficiency and processing of delivery orders.

One common example of a delivery order can include a return order. The United States Postal Service handled 72 million package returns in 2020 alone, and several ecommerce marketplaces experience a 10% return rate on orders. A quarter of end users (e.g., consumers) return between 5% and 15% of items that they purchase online and is a major friction point for end users. To successfully return an item, the consumer must return, re-package the item, route the package to a return location or courier obtain a refund for the item. Routing the package is often the most frustrating step for the consumer to return the item. For example, an ecommerce platform may require that the consumer to go to the post office to mail the package to a return location, or to drop-off the package at the return location themselves.

Embodiments can include a server computer that can receive several delivery orders and return orders from end users. The server computer can then create route plans that optimize routes that combine the delivery and/or return orders. The return orders and the delivery orders can be from different marketplaces, and specific windows can be used to create return efficiencies. The central server can create the optimized routes based on various factors. The factors may include (1) times to assign to the execution of the return orders (e.g., within specific time windows, at specific times, or at times mirroring delivery times) and (2) return bundling (e.g., delivering a bundle of items from different end users to the same store).

Other ways to improve upon efficiency and processing can include prompting the end users in a return marketplace in an application to check if the end users have any items that they want to return. Dynamic pricing of the return orders based on return efficiency can be used. In some cases, end users may be given discounts on item orders that can improve the efficiency of returns of other end users. For example, the server central computer can provide an end user a 10% discount if they order their hot dog from a first hot dog vendor rather than a second hot dog vendor. The first hot dog vendor may be closer to a return drop off point (e.g., a UPS store) than the second hot dog vendor. Orders placed with the first hot dog vendor may be coupled with returns to the return drop off point.

Although return orders are discussed in detail, other types of user initiated orders can include dry cleaning requests, person to person deliveries, and donation deliveries.

In some embodiments, a score routing algorithm be used to select candidate transporters for return deliveries. The score routing algorithm can be adjusted or modified based on return order factors and/or weights. In embodiments of the invention, the lowest score for a particular transporter can result in a selection of that transporter as a candidate transporter. In embodiments of the invention, the scoring system can be modified to account for return order factors and weights. For example, factors that can be used to score transporters for delivery orders can include a history of late deliveries, a history of early deliveries, and actual delivery times. Returns can change the factors or weights in the algorithm.

For example, a lateness score for a delivery order can indicate a potential lateness of the delivery. The lateness score can be determined as a difference between an estimated drop off time and the maximum allowed delivery time of the delivery. For example, a delivery order can include a delivery of food to an end user. The lateness score can be determined based on an estimated drop off time (e.g., when the transporter can deliver the food) and the maximum allowed delivery time of the delivery (e.g., 10 minutes after the food is prepared). The lateness score can also take into account scheduled pickup windows (e.g., for delivery orders that are return orders). For example, a return order can have a pickup window of 5 hours, during which the transporter can pick up a package. The lateness score can be determined based on the latest possible time during the pickup window. The lateness score can also be weighted differently for delivery orders that are return orders relative to delivery orders that involve perishables (e.g., food) because late returns are less problematic than late deliveries of perishables. In some embodiments, the score routing algorithm can be a composite algorithm that combines a first scoring algorithm for delivery orders and a second scoring algorithm for return orders.

Embodiments leverage existing transporter fleets to provide for the efficient transportation of items from first locations to second locations, and vice-versa. Embodiments can be applied to returning items for refunds. Examples of returns can include pre-packaged returns where packaged items are delivered from an end user to a courier service such as a post office, unboxed returns to retail stores, or integrated returns made on the platform. Transporter fleets can complete deliveries from commercial areas to residential areas after end users place orders in fulfilment requests, and then subsequently return to the commercial areas to return items. If an end user places a return order that is made in conjunction with a delivery to their pickup location, the incremental travel time by a transporter conducting the delivery and return transactions is minimized. The transporter utilizes their return trip to the commercial area to add value to the end user by completing the return order.

In a scenario, a transporter can complete delivery from a first service provider M1 in a commercial area to customer C1 in a residential area. The transporter receives a delivery opportunity from second service provider M2, which is close to M1, and accepts it. As a result, the transporters travels the distance M1→C1→M2.

Instead, assume that there is a drop off D1 to be made somewhere between C1→M2 (such as a USPS drop off box). The location of D1 is no more than 10% off of the designated route between the two locations (from a distance/travel time perspective). In this example, a package could be delivered from the customer at C1 to D1 (C1→D1) without significantly altering the transporter's designated route. In this example, it is efficient for the transporter to perform the drop off D1 as there is only an incremental increase in effort and travel distance. Embodiments of the invention can also employ dispatch and routing logic that can use knowledge of prior return orders to suggest certain delivery opportunities for transporters.

FIG. 1 shows a system 100 according to embodiments of the disclosure. The system of FIG. 1 includes a central server computer 102, a logistics platform 104, an end user device 106, an end user 108, a pickup location 110, a drop-off location 112, a transporter user device 114, a transporter 116, a transporter vehicle 118, a navigation network 120, and a service provider computer 122. The central server computer 102 can be in operative communication with the logistics platform 104, the end user device 106, the transporter user device 114, the navigation network 120, and the service provider computer 122. The transporter user device 114 can be in operative communication with the navigation network 120.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, although FIG. 1 shows one transporter 116, there can be two, three, or more transporters, transporter user devices, and transporter vehicles, etc.

Messages between the devices and the computers in the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The central server computer 102 can include a server computer that can facilitate in the fulfillment of fulfillment requests received from the end user device 106. For example, the central server computer 102 can identify the transporter 116 (from among many candidate transporters) operating the transporter user device 114 as being suitable for satisfying the fulfillment request. The central server computer 102 can identify the transporter user device 114 that can satisfy the fulfillment request based on any suitable criteria (e.g., transporter location, service provider location, end user destination, end user location, transporter mode of transportation, etc.).

The central server computer 102 can receive data relating to a first plurality of delivery orders from first service providers to first end users. The central server computer 102 can also receive data relating to a second plurality of delivery orders from second end users to second service providers. The central server computer 102 can determine a first plurality of routes corresponding to the first plurality of delivery orders. The central server computer 102 can determine a second plurality of routes corresponding to the second plurality of delivery orders. The central server computer 102 can then determine a set of optimal route plans by combining one or more of the first plurality of routes and one or more of the second plurality of routes. The central server computer 102 can receive acceptances from a plurality of transporters that will execute the set of optimal route plans. In some embodiments, the set of optimal route plans can be one route plan or many route plans. The central server computer 102 can facilitate execution of the optimal route plans.

The first users and the second users may be the same or different users. For example, in one embodiment, the first user may be person that wishes to order food from a restaurant, but also wants to deliver a package to the post office. The food order may be delivered by a transporter via a first route of the first plurality of routes, and the package delivery to the post office may be delivered by the same transporter via a second route of the second plurality of routes. Similarly, the first service providers and the second service provides can be the same or different.

The logistics platform 104 can include a location determination system, which can determine the locations of various user devices such as transporter user devices (e.g., the transporter user device 114) and end user devices (e.g., the end user device 106). The logistics platform 104 can also include routing logic to efficiently route transporters using the transport user devices to various pickup locations that have the packages that are to be delivered to drop-off locations. Efficient routes can be determined based on the locations of the transporters, the locations of the pickup locations, the locations of the drop-off locations, as well as external data such as traffic patterns, the weather, etc. The logistics platform 104 can be part of the central server computer 102 or can be system that is separate from the central server computer 102.

The end user device 106 can include a device operated by the end user 108. The end user devices 106 can generate and provide fulfillment request messages to the central server computer 102. The fulfillment request message can indicate that the request (e.g., a request for a service) can be fulfilled by the service provider computer 122. For example, the fulfillment request message can be generated based on a cart selected at checkout during a transaction using a central server computer application installed on the end user device 106. The fulfillment request message can include one or more items from the selected cart.

The end user device 106 can provide a fulfillment request message to the central server computer 102 that indicates that the end user device 106 is requesting that the transporter 116 pick up an item from the pickup location 110 (e.g., end user's 108 location) and deliver the item to the drop-off location 112 (e.g., the service provider computer's 122 location).

The pickup location 110 can be a location in which items are stored. In the context of an outbound delivery from an end user at an end user location, examples of the pickup location 110 may be a house or an apartment, a mailbox, a service provider location (e.g., a retail store, a grocery store, a dry cleaning store), a pickup hub, etc. Items can first be obtained from a pickup location 110 and then be transported to the drop-off location 112. Examples of the drop-off location 112 can be similar to the pickup location 110, such a house or apartment, a mailbox, a retail store, a grocery store, a dry cleaning store, a pickup hub, etc. In one example, the pickup location 110 can be a pizza parlor from which the end user 108 orders a pizza. The drop-off location 112 can be an apartment in which the end user 108 resides.

The transporter user device 114 can include a device operated by the transporter 116. The transporter user device 114 can include a smartphone, a wearable device, a personal assistant device, etc. The transporter 116 can accept an end user's fulfillment request via an acceptance message. For example, the transporter user device 114 can generate and transmit a request to fulfil a particular end user's fulfillment request to the central server computer 102. The central server computer 102 can notify the transporter user device 114 of the fulfillment request. The transporter user device 114 can respond to the central server computer 102 with a request to perform the delivery to the end user as indicated by the fulfillment request.

The transporter vehicle 118 can include a vehicle operated by the transporter 116. The transporter vehicle 118 can include a car, a truck, a van, a motorcycle, a bicycle, a drone, or other vehicle capable of being operated by the transporter 116.

The navigation network 120 can provide navigational directions to the transporter user device 114. For example, the transporter user device 114 can obtain a location from the central server computer 102. The location can be a service provider parking location, a service provider location, an end user parking location, an end user location, etc. The navigation network 120 can provide navigational data to the location. For example, the navigation network 120 can be a global positioning system that provides location data to the transporter user device 114.

The service provider computer 122 include computers operated by a service provider. For example, the service provider computer 122 can be a food provider computer that is operated by a food provider. The service provider computer 122 can offer to provide services to the end user 108 of the end user device 106. In embodiments of the invention, the service provider computer 122 can receive requests to prepare one or more items for delivery from the central server computer 102. The service provider computer 122 can initiate the preparation of the one or more items that are to be delivered to the end user 108 of the end user device 106 by the transporter 116 of the transporter user device 114.

Figure 2:
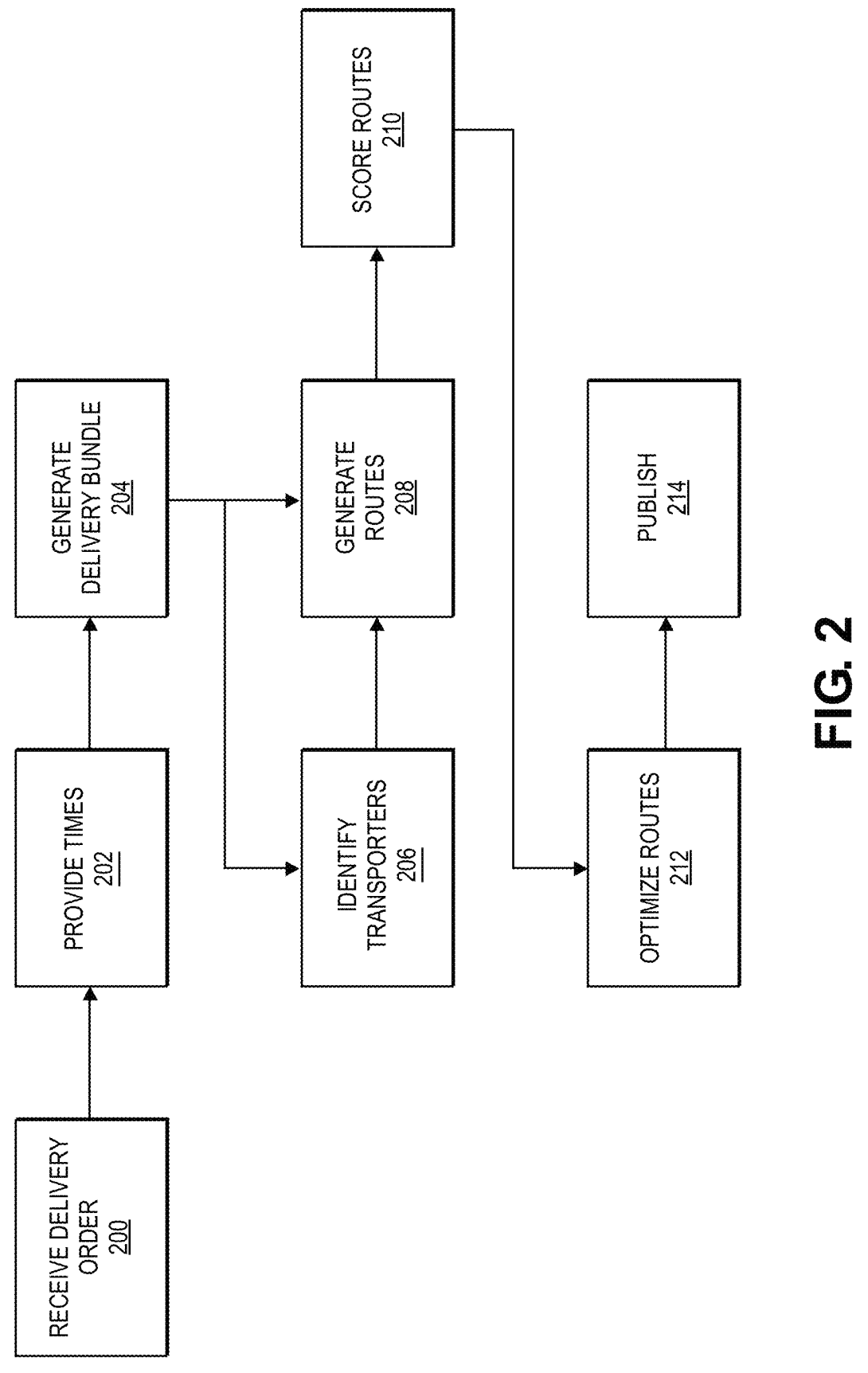
FIG. 2 shows of a flow diagram illustrating a method to route delivery orders according to embodiments.

FIG. 2 shows of a flow diagram illustrating a method to route delivery orders according to embodiments. The method illustrated in FIG. 2 will be described in the context of a central server computer 102 receiving delivery orders and determining optimal route plans based on the delivery orders. The method illustrated in FIG. 2 can be performed by the system 100 illustrated in FIG. 1.

At step 200, the central server computer 102 can receive one or more delivery orders from one or more end user devices operated by one or more end users. For example, the end users may use a delivery application on the end user devices (e.g., an application installed on the end user device or a website accessed using the end user devices) to transmit delivery orders to the central server computer 102. The central server computer 102 can receive the delivery orders. The delivery orders can indicate that delivers are to be made from service provider locations to end user locations (or vice-versa).

An example of a delivery order from a service provider to an end user can include a request to obtain one or more items from a service provider. The one or more items can include, for example, a pack of bottled water from a grocery store, a hammer from a hardware store, etc. Examples of delivery orders from end users to service providers can include a request to deliver dry cleaning to a dry cleaner, a return order to a courier or retail store (e.g., a request to return a purchased item to a retail store), a peer-to-peer delivery order (e.g., a request to pick up an item from a first user and deliver it to a second user), etc. The delivery order can include data to fulfill the delivery request including an order type, an indication of an item, a pickup location, and a drop-off location. In some embodiments, the delivery order can include a scheduling range by which that that order is to be fulfilled. For example, the delivery order can be a return order that indicates an item should be picked up before 7:00 PM. The delivery order can also indicate a scheduling range that includes a deadline before which the item should be delivered (e.g., deliver food within 20 minutes of preparation, with a delivery deadline of 6:40).

A return order can also include metadata. The metadata can include data relating to a delivery order (e.g., related order numbers, instruction data, etc.). For example, bundled order metadata can include data which links the return order to the order of the original delivery placed by the end user 108 (e.g., the end user 108 may be returning an item to a retailer and the request to do so may be received as a part of a delivery order). Pickup instruction metadata can include data which provides instructions to a transporter regarding any item pickups and drop offs that the transporter may perform.

At step 202, the central server computer 102 can set times for each of the plurality of delivery orders. For example, after receiving a delivery order, the central server computer 102 can determine the type of delivery order (e.g., return order, delivery order, delivery order that includes perishables, etc.) that is received. The central server computer 102 can provide different times for different types of delivery orders. For example, a food order may be provided a short time for delivery (e.g., 30 minutes), while a return order may be provided a longer time delivery (e.g., 3 hours). In some embodiments, when the delivery order includes a scheduling range, the central server computer 102 may use the scheduling range for the time to provide of the delivery order.

At step 204, the central server computer 102 may generate one or more delivery order bundles using data of the plurality of delivery orders received. A delivery order bundle can include two or more delivery orders. The central server computer 102 can generate a delivery order bundle that includes two or more delivery orders that are related in geolocation or time. For example, the central server computer 102 can generate a delivery order bundle that includes three delivery orders that all are located within a certain geographic location (e.g., within the same ZIP code, within a three mile radius, within the same city, within the same neighborhood, etc.).

If a sufficient number of return orders are made on a single day in a given area (e.g., as received during step 200), the return orders can be bundled together in a delivery order bundle such that the incremental effort of each return order beyond the first return order becomes negligible. In doing so, a drastic reduction in the average cost of fulfillment in terms of time, distance, etc. of return orders is provided, especially if most of the return orders have the same or proximate drop-off points. The central server computer 102 may access the pickup locations and the drop-off locations of delivery orders and group proximate locations together.

As an illustrative example, if a first delivery order is to pick up a hammer at a hardware store and deliver the hammer to an apartment building, while a second delivery order is to pick up a pack of bottled water from a grocery store near the hardware store and deliver the pack of bottled water to a house near the apartment building, the central server computer 102 can bundle the first delivery order and the second delivery order together to create a delivery order bundle.

In some embodiments, transporters can complete delivery orders in which they obtain items in commercial areas and deliver the item to residential areas. During this time, they can complete orders that are near the locations of their current route. In some embodiments, the central server computer 102 may generate a delivery order bundle if the route of two delivery orders deviates no more than 10%, or are within a set distance of each other (e.g., 2 blocks, 1 mile, etc.).

In some embodiments, a delivery order bundle can have a delivery order bundle type. Examples of delivery order bundle types include a same-store large bundle, a plan and save bundle, a same store bundle (e.g., a delivery order bundle with multiple delivery orders that have a same pickup or drop-off location), a same block bundle (e.g., a delivery order bundle with multiple delivery orders that have a pickup or drop-off locations proximate to each other), a rule-base bundle (e.g., a delivery order bundle with a delivery order that has a scheduling range), a force batch early bundle, and/or a reverse route bundle (e.g., a delivery order bundle including a return order). The same store bundle and the same block bundle in specific bundle orders can result in the efficiency gains (in time spent and distance traveled to complete the delivery order). Other efficiency gains can result from making use of a reverse trip in addition to the primary trip, and from situations in which there are multiple reverse routes to bundle together. In some embodiments, delivery order bundles may be limited such that they can contain a maximum number of delivery orders (e.g., a delivery order bundle may only comprise of 2 delivery orders, 4 delivery orders, etc.).

In some embodiments, at step 206, after generating the one or more delivery order bundles, the central server computer 102 may identify one or more transporters that are proximate to one or more pickup locations of a delivery order bundle. For example, the central server computer 102 may communicate with the logistics platform 104 to access the location data of transporter user devices to determine if there are any transporter user devices that are currently near a pickup location or are completing a delivery order near a pickup location. If one or more transporter user devices are identified as available for the delivery order bundle, then the one or more transporter user devices and their locations can be taken into account during route generation at step 208.

At step 208, after generating the one or more delivery order bundles and, in some embodiments, identifying one or more transporter user devices, the central server computer 102 may determine a plurality of routes corresponding to the plurality of delivery orders and delivery order bundles to be completed. The central server computer 102 in conjunction with the logistics platform 104 may determine the most efficient route for each delivery order in the one or more delivery order bundles. The central server computer 102 can generate a route for each delivery order. Each route of the plurality of routes can include a path taken in getting from a starting point (e.g., a pickup location) to a destination point (e.g., a delivery location). Each route can be a path along which the transporter can travel using a transporter vehicle.

As an example, for a delivery order bundle comprising three delivery orders, the central server computer 102 can determine a first route for obtaining an item from a first pickup location and dropping off the item at a first drop-off location, a second route for obtaining a second item from a second pickup location and dropping off the second item at a second drop-off location, and a third route for obtaining a third item from a third pick up location and dropping off the third item at a third drop-off location. As such a delivery order bundle can be associated with one or more routes.

At step 210, after generating the plurality of routes, the central server computer 102 may score the plurality of routes. The central server computer 102 can score the plurality of routes based on one or more metrics related to the routes, the delivery order bundles, the items included in the deliveries, etc. The central server computer 102 can generate a score for each route. The score can indicate the quality of the route in comparison to the other routes.

For example, the central server computer 102 can use a composite scoring algorithm to provide a score for several metrics of each route of the plurality of routes. Example metrics can include a delivery time score, a lateness score, an earliness score, a DAT score, a variability score, the current traffic status of the route, a utilization factor of transporters near the route, etc. A lower score can indicate a better performing route. However, it is understood that the score can be determined in such a way that a higher score can indicate a better performing route.

The delivery time score can be determined based on a calculated drop off time (e.g., a time that the delivery needs to be made by) and an estimated time of arrival of a transporter (e.g., a time that the transporter is estimated to reach the drop off location by). For example, a delivery order can have a calculated drop off time of 30 minutes after the order is completed. The transporter may be in such a location that the items can be delivered to the drop off location 20 minutes after the order is completed. The delivery time score can be the difference between the calculated drop off time and the estimated time of arrival of a transporter (e.g., 10 minutes of difference).

The lateness score can be determined based on a calculated drop off time, an estimated time of arrival of a transporter, and a force multiplier value. The calculated drop off time and the estimated time of arrival of a transporter can be the same as the metrics used to determine the delivery time score, above. The force multiplier value can be a parameter that changes based on the type of delivery order. A delivery order that involves perishables can have a larger force multiplier (e.g., 2) to negatively affect the potential route if the perishables are predicted to be delivered late. A delivery order that does not involve perishables (e.g., a return order) can have a smaller force multiplier (e.g., 0.5). The lateness score can be equal to the difference between the calculated drop off time and the estimated time of arrival of the transporter to the power of the force multiplier. If the lateness score is negative (e.g., the delivery will not be late), then the lateness score can equal zero. The lateness score can be determined as the difference between the calculated drop off time and the estimated time of arrival of the transporter to the power of the force multiplier. As an illustrative example, a deliver order for food can have a calculated drop off time of 20 minutes after the food is prepared, and the transporter may be in such a location that the food is predicted to be dropped off in 30 minutes after the food is prepared. The lateness score can be equal to $(10)^{2}=100$.

The earliness score can apply a score penalty to a route if the transporter is estimated to arrive to pick up an item prior to the item being ready for pickup. The variability score can apply a score penalty to a route based on the length of the route, thus decreasing the potential number of long routes.

The composite scoring algorithm can comprise one or more scoring algorithms used to score different types of delivery orders. For example, a first scoring algorithm can use a first plurality of metrics to improve efficiencies of delivery orders from service providers to end users (e.g., item orders, food delivery orders, etc.), and a second scoring algorithm can use a second plurality of metrics to improve efficiencies of delivery orders from end users to service providers (e.g., return orders, dry cleaning orders, peer-to-peer deliveries, etc.). As an example, when determining the score for a deliver order that is a return of a package, the second scoring algorithm may weigh the earliness score (e.g., when the transporter picks up the package from the end user) more heavily and weigh the delivery time score less heavily (e.g., when the transporter delivers the package). This can be due to the fact that the end user is more aware of when their package is picked up since they may know when the transporter is picking up the package from them, but the end user is not as aware when the package arrives at the drop-off location. Thus, the scoring algorithm can both optimize the delivery of the packages in a timely manner as well as improve end user experience by promoting scoring parameters that impact events involving the end user (e.g., pickup from the end user).

At step 212, after scoring the plurality of routes, the central server computer 102 may optimize the plurality of routes to determine a set of optimal route plans. The central server computer 102 may communicate with the logistics platform 104 to combine routes corresponding to delivery orders to determine an optimal route plan. An optimal route plan can include one or more routes. The optimal route plan can include routes that overlap in location and time within one another. The central server computer 102 can generate an optimal route plan that include routes with similar times and locations.

For example, for the above-described example of a delivery order bundle comprising three delivery orders, the central server computer 102 can combine the first route, the second route, and the third route to generate an optimized route. For example, the optimized route can start from the first pickup location, and then lead to the second pickup location, to the first drop-off location, to the third pick up location, to the second drop-off location, and then to the third drop-off location. The different delivery orders need not be completed in order back to back starting with the first route, since the optimal route plan indicates that the second item is to be picked up at the second pickup location between when the first item is picked up at the first pickup location and delivered at the first drop-off location.

At step 214, after optimizing the plurality of routes to determine the set of optimal route plans, the central server computer 102 may publish the set of optimal route plans to a platform that can be accessed by a transporter user device. An optimal route plan can then be requested by the transporter. The transporter can then execute the optimal route plan.

Figure 3:
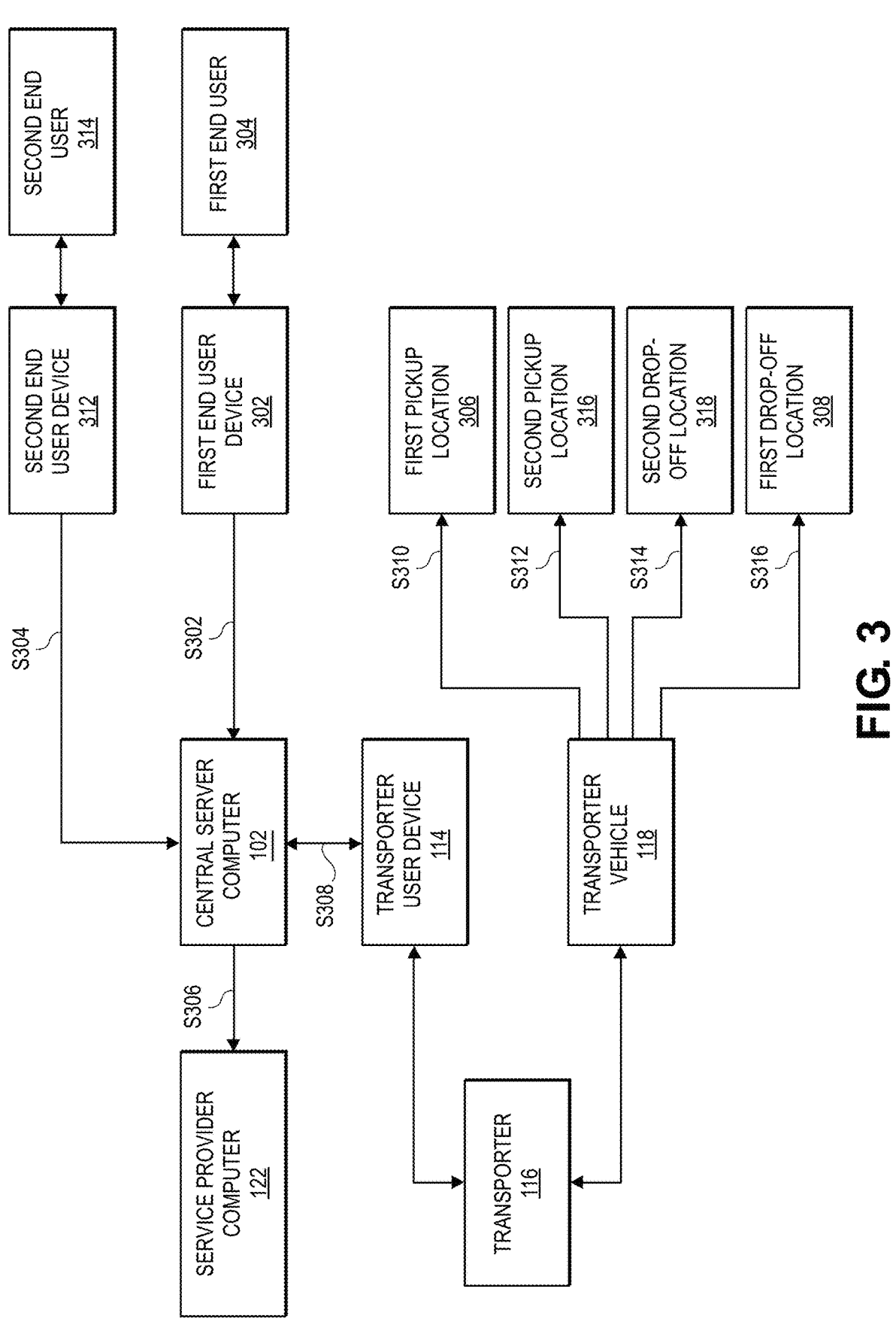
FIG. 3 shows a diagram illustrating a delivery according to embodiments.

FIG. 3 shows a diagram illustrating a delivery platform according to embodiments. The method illustrated in FIG. 3 will be described in the context of a central server computer 102 publishing one or more optimal route plans to a delivery platform, where transporters request and execute the optimal route plans. In some embodiments, the optimal route plan selected by the transporter can include orders received from two different end user devices. The method illustrated in FIG. 3 can be performed by the system 100 illustrated in FIG. 1.

Prior to step S302, a first end user device 302 can select one or more items in a central server computer application installed on the first end user device 302 (e.g., a delivery application). The one or more items can be items that are provided by a service provider of the service provider computer 122.

At step S302, the first end user device 302 may transmit a first fulfillment request message to the central server computer 102. The fulfillment request message may be an example of a delivery request message. For example, a first end user 304 may use a delivery application on the first end user device 302 to transmit the first fulfillment request message to the central server computer 102. The first fulfillment request message can include a delivery order. The first fulfillment request can indicate a delivery order that is ordering a delivery from the service provider computer 122 to the first end user 304. The first fulfillment request message can involve a delivery order for food items.

In some embodiments, after receiving the first fulfillment request message, the central server computer 102 can perform a transaction process with the first end user device 302. For example, the central server computer 102 can communicate with a payment network to process the transaction for the one or more items. The central server computer 102 can receive an indication of whether or not the transaction is authorized. If the transaction is authorized, then the central server computer 102 can proceed with step S304. If the transaction is not authorized, then the central server computer 102 can terminate the process.

Prior to step S304, a second end user device 312 can select a package to return via a central server computer application installed on the second end user device 312 (e.g., a delivery application). The package can include one or more items that are to be returned to a service provider via a post office.

At step S304, the second end user device 312 may transmit a second fulfillment request message to the central server computer 102. The second fulfillment request message may be an example of a second delivery request message. For example, a second end user 314 may use the delivery application on the second end user device 312 to transmit the second fulfillment request message to the central server computer 102. The second fulfillment request message can include a return order. The second fulfillment request can indicate a return order that is returning a package from second end user 314 to a post office.

In some embodiments, after receiving the second fulfillment request message, the central server computer 102 can perform a transaction process with the second end user device 312. For example, the central server computer 102 can communicate with a payment network to process the transaction for the return process. The central server computer 102 can receive an indication of whether or not the transaction is authorized. If the transaction is authorized, then the central server computer 102 can proceed with step S306. If the transaction is not authorized, then the central server computer 102 can terminate the process.

At step S306, after receiving the first fulfillment request message, the central server computer 102 can provide the first fulfillment request message, or a derivation thereof, to the service provider computer 122. The central server computer 102 can determine which service provider computer of a plurality of service provider computers to communicate with based on the service provider indicated in the first fulfillment request message. For example, the first fulfillment request message can indicate that the one or more items are provided by the service provider of the service provider computer 122. The central server computer 102 can identify the service provider computer 122 using the service provider computer identifier in the first fulfillment request message.

Upon receiving the first fulfillment request message, the service provider computer 122 can initiate preparation of the one or more items. For example, the service provider computer 122 can alert employees at the service provider (e.g., those preparing the items) at the service provider location. The service provider can then prepare the one or more items for pick up by a transporter.

At step S308, the central server computer may generate and publish a set of optimized route plans as described in reference to FIG. 2 based on the first fulfillment request message and the second fulfillment request message. The set of optimized route plans can include an optimized route plan that includes the deliveries corresponding to the first fulfillment request message and the second fulfillment request message. For example, the optimal route plan can indicate that the one or more items of the first fulfillment request are to be picked up at the first pickup location 306 and delivered to the first drop-off location 308. The optimal route plan can also indicate that the package of the second fulfillment request is to be picked up at the second pickup location 316 and delivered to the second drop-off location 318. As an example, the first pickup location 306 can be the closest pickup location to the transporter user device's 114 starting location. The second pickup location 316 and the second drop-off location 318 can be located between the first pickup location 306 and the first drop-off location 308. The optimal route plan can indicate that the locations are to be arranged as follows: 1) first pickup location 306, 2) second pickup location 316, 3) second drop-off location 318, 4) first drop-off location 308.

As an illustrative example, the central server computer 102 can generate two different routes involving the first delivery order and the second delivery order. The transporter can be located near the first pickup location 306. The second pickup location 316 can be located between the first pickup location 306 and the second drop-off location. The second drop-off location 318 can be located between the second pickup location 316 and the first drop-off location 308.

The first route can include the transporter 1) picking up the food from the first pickup location 306, 2) picking up package from the second pickup location 316, 3) dropping off the package at the second drop-off location 318, and 4) dropping off the food at the first drop-off location 308.

The central server computer 102 can score the first route. The score can be determined based on a delivery time score and a lateness score for each delivery of the first route. For example, the central server computer 102 can determine a first score equal to lateness_score_1a+delivery_time_score_1a+lateness_score_1b+delivery_time_1b, where 1 indicates route 1, a indicates scoring for the food delivery, and b indicates scoring for the package delivery. Although the scoring in this example involves two variables, it can include many other variables in other embodiments (e.g., traffic data scores, scores for accessibility issues at the pick up or drop off locations, earliness scores, etc.

The lateness_score_1a for the food delivery can be equal to the difference between the calculated drop off time (e.g., 7:00 PM) (i.e., the time at which the delivery of food is considered late) and the estimated time of arrival of the transporter (e.g., 6:56 PM) (e.g., an estimated time when the transporter will arrive at the drop off location) to the power of the force multiplier (e.g., 3), which can equal to 0 since the transporter will not be late. The delivery_time_score_1a can be equal to the difference between the calculated drop off time (e.g., 7:00 PM) and the estimated time of arrival of the transporter (e.g., 6:56 PM), which can be equal to −4 (the difference between 7:00 PM and 6:56 PM is 4 minutes).

The lateness_score_1b for the package delivery can be equal to the difference between the calculated drop off time (e.g., 9:00 PM) (i.e., the time at which the delivery of the package is considered late) and the estimated time of arrival of the transporter (e.g., 6:45 PM) (e.g., an estimated time when the transporter will arrive at the drop off location for the package) to the power of the force multiplier (e.g., 0.5), which can equal to 0 since the transporter will not be late. The delivery_time_score_1b can be equal to the time the between the calculated drop off time (e.g., 9:00 PM) and the estimated time of arrival of the transporter (e.g., 6:45 PM), which can be equal to −135 (9:00 PM−6:45 PM=135 minutes).

The first score for the first route can be equal to 0+−4+0+−135=−139.

In the above example, the lateness score is zero if it is negative, because the transporter will arrive at their destination before they are considered late. If they are estimated to be late, then the force multiplier gives the lateness a higher weighting in the algorithm, relative to other variables such as the delivery time score. This is because being very late on a food delivery is much worse than not arriving exactly on time, so the algorithm produces a score that would discourage selection of routes that would result in late delivery times.

The second route can include the transporter 1) picking up the package from the second pickup location 316, 2) picking up the food from the first pickup location 306, 3) delivering the package at the second drop-off location 318, and 4) delivering the food at the first drop-off location 308.

The central server computer 102 can determine a second score equal to lateness_score_2a+delivery_time_score_2a+lateness_score_2b+delivery_time_2b, where 2 indicates route 2, a indicates scoring for the food delivery, and b indicates scoring for the package delivery.

The lateness_score_2a for the food delivery can be equal to the difference between the calculated drop off time (e.g., 7:00 PM) (i.e., the time at which the delivery of food is considered late) and the estimated time of arrival of the transporter (e.g., 7:05 PM) to the power of the force multiplier (e.g., 3), which can equal to 125 [(7:05 PM-7:00 PM]^3=125. The delivery_time_score_2a can be equal to the between the calculated drop off time (e.g., 7:00 PM) (i.e., the time at which the delivery is considered late) and the estimated time of arrival of the transporter (e.g., 7:05 PM), which can be equal to 5 (7:05 PM-7:00 PM=5 minutes).

The lateness_score_2 for the package delivery can be equal to the difference between the calculated drop off time (e.g., 9:00 PM) (i.e., the time at which the delivery of the package is considered late) and the estimated time of arrival of the transporter (e.g., 6:54 PM) to the power of the force multiplier (e.g., 0.5), which can equal to 0 since the transporter will not be late (6:54 PM-9:00 PM=−126 minutes; since −126 is negative, the lateness_score is equal to zero). The delivery_time_score_2 can be equal to the between the calculated drop off time (e.g., 9:00 PM) (i.e., the time at which the delivery of the package is considered late) and the estimated time of arrival of the transporter (e.g., 6:54 PM), which can be equal to −126 (6:54 PM-9:00 PM=−126 minutes.

The second score for the second route can be equal to 125+5+0+−126=4.

The central server computer 102 can compare the first score (−139) for the first route to the second score (4) for the second route. The first score is lower than the second score, thus indicating a more optimal route. The central server computer 102 can select the first route as an optimized route plan and can publish the optimized route plan to the delivery platform.

After the set of optimized route plans are published, the transporter user device 114 can access the set of optimized route plans and choose one optimized route plan to execute. For example, the transporter user device 114 can generate an acceptance of the optimized route plan to be executed by the transporter 116. The transporter user device 114 can transmit the acceptance of the optimized route plan to the central server computer 102.

The central server computer 102 may then facilitate the execution of the optimized route plans. For example, the central server computer 102 may provide continuous access to the optimized route plan. For example, after receiving the acceptance of the optimized route plan, the central server computer 102 can notify the end user device 106 and the service provider computer associated with the optimal route plan of the acceptance notification.

The central server computer 102 can also track the progress of the transporter user device 114 of the transporter that accepted the optimal route plan along the optimal route plan. For example, the central server computer 102 can check the location of the transporter user device 114 (e.g., by requesting the location from the transporter user device 114). The central server computer 102 can obtain the location of the transporter user device 114 continuously, every minute, every 5 minutes, etc.

The central server computer 102 can notify the end user device 106 and the service provider computer 122 that are associated with the optimal route plan of the progress.

At step S310, after accepting the optimal route plan, the transporter user device 114 can prompt the transporter 116 to proceed to the first pickup location 306. The transporter 116 can operate the transporter vehicle 118 to travel to the first pickup location 306 to obtain the one or more items for the fulfilment request. As an example, the first pickup location 306 may be the closest pickup location to the transporter's 116 initial starting point when selecting to accept the optimal route plan.

The first pickup location 306 can be the pickup location for the first fulfillment request. The first pickup location 306, for example, can be a location of the service provider computer 122 that has prepared the one or more items for the first fulfillment request. The transporter 116 can pick up the one or more items from the first pickup location 306. The destination of the one or more items for the first fulfillment request can be the first drop-off location 308.

At step S312, the transporter 116 may then travel from the first pickup location 306 to the next location as indicated in the optimal route plan. As such, the transporter 116 can travel from the first pickup location 306 to the second pickup location 316. The transporter 116 can pick up the package for the second fulfillment request at the second pickup location 316.

At step S314, after picking up the one or more items from the first pickup location 306 and picking up the package from the second pickup location 316, the transporter 116 can travel to the next location as indicated in the optimal route plan. The transporter 116 can travel to the second drop-off location 318 to drop off the package for the second fulfillment request.

At step S316, the transporter 116 can travel to the first drop-off location 308 using the transporter vehicle 118. The transporter 116 can provide the one or more items to the first drop-off location 308 for the first fulfillment request. After, both the package and the one or more items are delivered, the optimal route plan can be marked as completed. The transporter user device 114 can provide an indication that the optimal route plan has been completed. After the delivery order is completed, the central server computer 102 can remove the optimal route plan from the platform.

Additional details regarding service provider onboarding methods and return validation processing can be found in U.S. patent application Ser. No. 18/345,969 filed on Jun. 30, 2023, the same day as the present application and entitled "Efficient and Accurate Return Package Deliveries With Distributed Fleet". This U.S. Patent Application is herein incorporated by reference for all purposes.

FIGS. 4A, 4B, and 4C show user interfaces of an end user device according to embodiments. The user interfaces can be generated and provided by the central server computer 102.

FIG. 4A shows a first user interface 410 in which an end user can initiate a delivery order. The first user interface 410 can display an estimated cost and time of the delivery order. The first user interface 410 can allow an end user to select a delivery order that is a return order of a package. For example, the end user can have a package that is to be returned to a service provider. The end user can initiate the return of the package via the first user interface 410.

In some embodiments, the first user interface 410 can display a greater discount on a first delivery order provided by a first service provider that is closer to a route corresponding to a return order associated with a second end user, than a second delivery order provided by a second service provider that is further from the route corresponding to the return order.

After selecting to return a package, the end user device can display a second user interface 420 illustrated in FIG. 4B. FIG. 4B shows the second user interface 420 that displays a delivery order scheduling range. The second user interface 420 can allow the end user to view a scheduling range 422 including the hours during which the package can be picked up at the end user's location. For example, the scheduling range 422 can indicate that the package can be picked up between 9:00 AM and 4:40 PM. In some embodiments, the end user may be presented with one or more scheduling ranges to select from. In other embodiments, the end user can input a custom scheduling range for pickup of the package.

After selecting the scheduling range, the end user device can display a third user interface 430 illustrated in FIG. 4C.

FIG. 4C shows the third user interface 430 that displays a selection of drop-off locations. The selection of drop-off locations includes a drop-off location 1, a drop-off location 2, and a drop-off location 3. The third user interface 430 can allow the end user to select between one or more drop-off locations for the package that is to be returned to the service provider. The drop-off location can depend on where the package needs to be returned to. For example, the one or more drop-off locations can include a service provider location (e.g., a store), a post office, a different delivery system entry point, etc. The end user can select the location to return the package to (e.g., the drop-off location).

Figure 5:
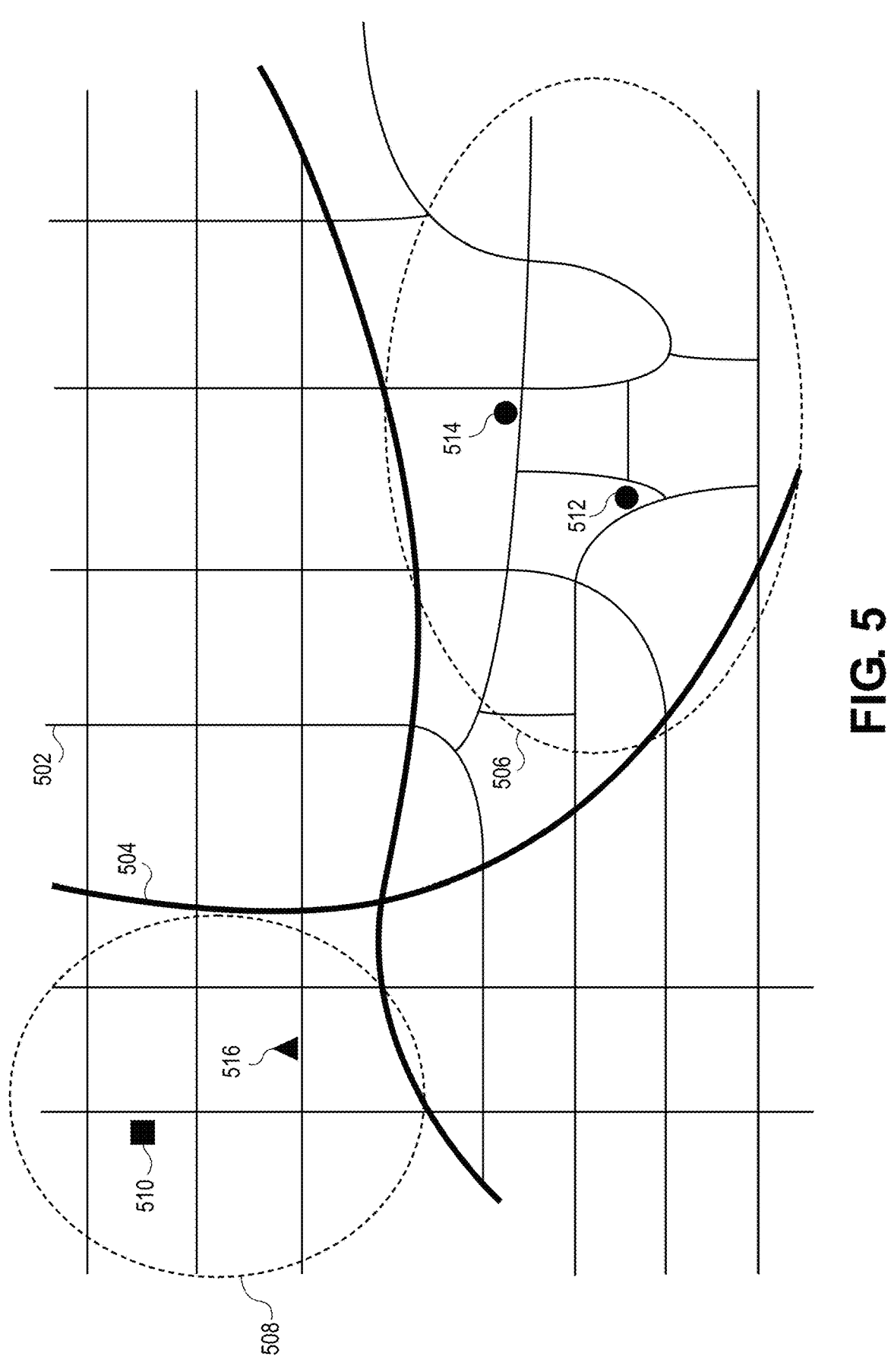
FIG. 5 shows a map illustrating a route according to embodiments.

FIG. 5 shows a map illustrating a route according to embodiments. The map includes smaller roads 502 and larger roads 504 as illustrated by the line weight of the road. The map includes a number of city districts (e.g., neighborhoods) including a residential district 506 and a commercial district 508. The residential district 506 can mainly include houses whereas the commercial district 508 can mainly include businesses. Embodiments provide for efficient routing between districts.

The map also includes a number of locations including a restaurant 510, a first house 512, a second house 514, and a post office 516. The restaurant 510 and the post office 516 can be located within the commercial district 508. The first house 512 and the second house 514 can be located within the residential district 506.

A central server computer can receive a first fulfillment request comprising data relating to a first delivery order from the restaurant 510 (e.g., a service provider) to the first house 512 (e.g., an end user location). The central server computer can receive the first fulfillment request from a first end user device operated by a first user that is associated with the first house 512.

The central server computer can also receive a second fulfillment request comprising data relating to a second delivery order from the second house 514 to the post office 516. The central server computer can receive the second fulfillment request from a second end user device operated by a second user that is associated with the second house 514. The second delivery order can be a return order.

The central server computer can determine an optimal route plan, as described herein, that includes the first delivery order and the second delivery order. The central server computer can determine that in the optimal route plan the first delivery order is to be delivered prior to the second delivery order. This can be due to a score that indicates that the first delivery order, which involves a perishable (e.g., food), is more urgent than the second delivery order, which involves a return package.

The optimal route plan can indicate that a transporter is to pick up one or more items of the first delivery order at the restaurant 510 in the commercial district 508. The optimal route plan can then indicate that the transporter is to proceed to the first house 512 in the residential district 506 to deliver the one or more items. The optimal route plan can then indicate that the transporter is to proceed to the second house 514 in the residential district 506 to pick up the return package. The optimal route plan can then indicate that the transporter is to proceed to the post office 516 in the commercial district 508 to deliver the return package.

The optimal route plan can end with the transporter arriving back in the commercial district 508 such that future deliveries are more efficient since the transporter is already located in the commercial district 508 for deliveries originating from commercial buildings.

By combining the first delivery order and the second delivery order into the optimal route plan, embodiments provide for the advantage of reducing the amount of transporter transit time spent with no deliverable. For example, without bundling return orders with delivery orders, the transporter would need to drive from the residential district 506 back to the commercial district 508 for the next delivery order without bringing any delivery as they drive. This is a wasted leg of the transporter's path. Embodiments reduce such wasted transit times by optimizing route plans that can include return orders.

As an illustrative example, previously transporters would pick up a food delivery from the restaurant 510 and drive 4 miles to the first house 512 to deliver the food. The transporter would then need to drive 4 miles back to the commercial district 508. During the 4 mile drive back to the commercial district, the transporter is not transporting any deliveries. The transporter would then wait for a next delivery from the commercial district 508. In such a case, the package from the second house is not yet delivered, so a second transporter would need to pick up the package from the second house 514 and drive 3 miles to the post office 516.

Embodiments provide for systems and methods that create optimal route plans that can include return deliveries. For example, a transporter can pick up a food delivery from the restaurant 510 and drive 4 miles to the first house 512 to deliver the food. The transporter can then drive 0.1 mile to the second house 512 to pick up a package. The transporter can then drive 3 miles to the post office 516 to deliver the package. The transporter is then located in the commercial district 508 where they can perform the next delivery.

Comparing the above route examples, the method according to embodiments can reduce the transport time and distance for the delivery order and return order by about 50%.

Embodiments of the invention reduce the total amount of miles driven and the amount of time transporters spend travelling without a delivery. Since there are millions of deliveries made each day in the United States, for the aforementioned distances, embodiments could result in saving millions of miles of extra travel per day as well as millions of miles of transporters driving without deliveries.

Figure 6:
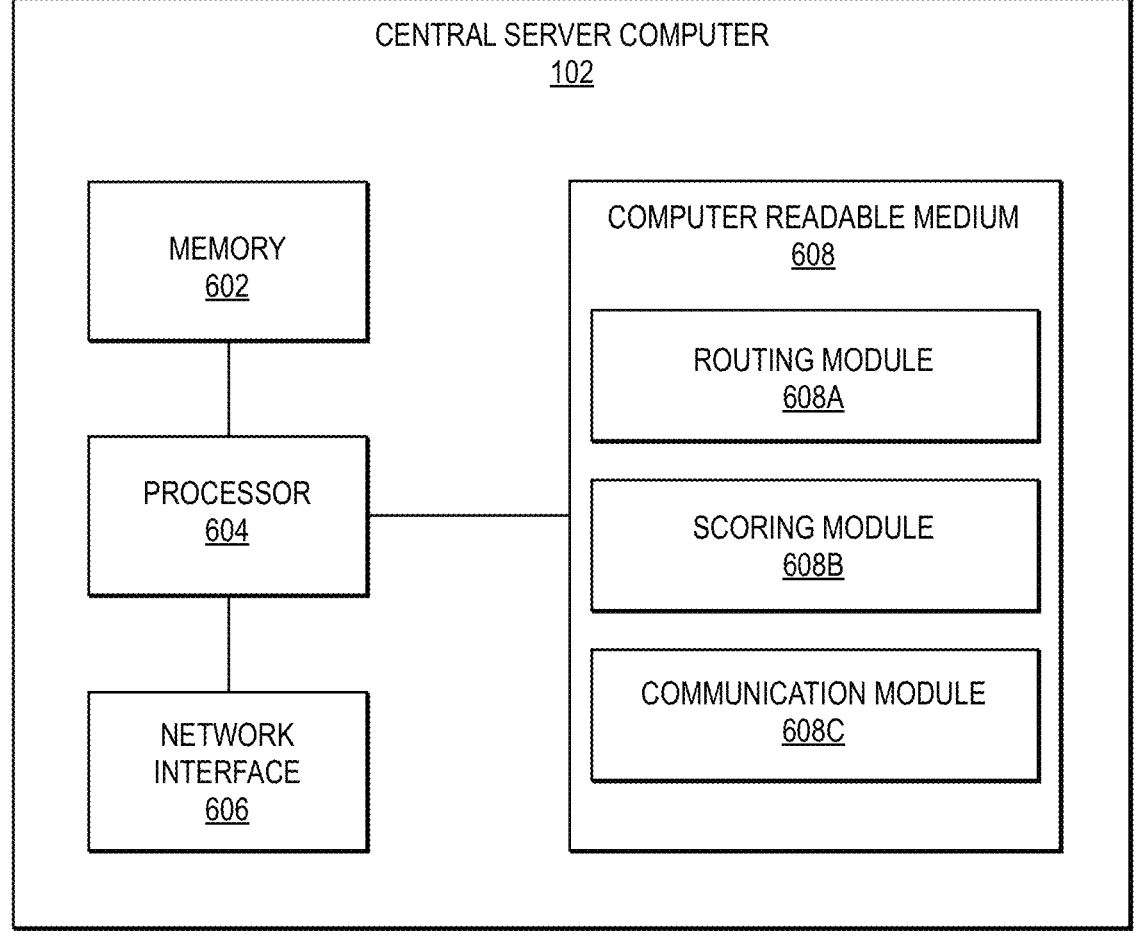
FIG. 6 shows a block diagram of a central server computer according to embodiments.

FIG. 6 shows a block diagram of a server computer 600 according to embodiments. The exemplary server computer 600 may comprise a processor 604. The processor 604 may be coupled to a memory 602, a network interface 606, and a computer readable medium 608. The computer readable medium 608 can comprise a routing module 608A, a scoring module 608B, and a communication module 608C.

The memory 602 can be used to store data and code. For example, the memory 602 can store delivery orders, routes, optimal route plans, etc. The memory 602 may be coupled to the processor 604 internally or externally (e.g., cloud based data storage), and may comprise any combination of volatile and/or non-volatile memory, such as RAM, DRAM, ROM, flash, or any other suitable memory device.

The computer readable medium 608 may comprise code, executable by the processor 604, for performing a method comprising: the computer-readable medium comprising code executable by the processor for implementing a method comprising: receiving data relating to a first plurality of delivery orders from first service providers to first end users, and data relating to a second plurality of delivery orders from second end users to second service providers; determining a first plurality of routes corresponding to the first plurality of delivery orders from the first service providers to the first end users; determining a second plurality of routes corresponding to the second plurality of end users to the second service providers; determining a set of optimal route plans by combining one or more of the first plurality of routes and one or more of the second plurality of routes; receiving acceptances from one or more transporters that will execute the set of optimal route plans; and facilitating, by the server computer, execution of the set of optimal route plans.

The routing module 608A may comprise code or software, executable by the processor 604, for determining routes. The routing module 608A, in conjunction with the processor 604, can determine one or more routes for one or more delivery orders. The routing module 608A, in conjunction with the processor 604, can determine a plurality of routes corresponding to a plurality of delivery orders and delivery order bundles to be completed. The routing module 608A, in conjunction with the processor 604, in conjunction with the logistics platform 104 may determine the most efficient route for each delivery order in the one or more delivery order bundles. routing module 608A, in conjunction with the processor 604, can generate a route for each delivery order. Each route of the plurality of routes can include a path taken in getting from a starting point (e.g., a pickup location) to a destination point (e.g., a delivery location). Each route can be a path along which the transporter can travel using a transporter vehicle.

The scoring module 608B can include may comprise code or software, executable by the processor 604, for scoring. The scoring module 608B, in conjunction with the processor 604, can score routes. The scoring module 608B, in conjunction with the processor 604, can receive the plurality of routes from the routing module 608A. The scoring module 608B, in conjunction with the processor 604, can score the plurality of routes based on one or more metrics related to the routes, the delivery order bundles, the items included in the deliveries, etc. The scoring module 608B, in conjunction with the processor 604, can generate a score for each route. The score can indicate the quality of the route in comparison to the other routes.

The scoring module 608B, in conjunction with the processor 604, can use a composite scoring algorithm to provide a score for several metrics of each route of the plurality of routes. Example metrics can include a pickup time score, a delivery time score, a lateness score, an earliness score to penalize arriving before the estimated arrival time, a DAT score, a variability score to penalize a longer route, the current traffic status of the route, a utilization factor of transporters near the route, etc. The composite scoring algorithm can comprise one or more scoring algorithms used to score different types of delivery orders. For example, a first scoring algorithm can use a first plurality of metrics to improve efficiencies of delivery orders from service providers to end users (e.g., item orders, food delivery orders, etc.), and a second scoring algorithm can use a second plurality of metrics to improve efficiencies of delivery orders from end users to service providers (e.g., return orders, dry cleaning orders, peer-to-peer deliveries, etc.). As an example, for a return order, the second scoring algorithm may more heavily weigh the earliness score and weigh the delivery time less, as the end user is more sensitive to when their item is picked up, but not when it arrives at the drop-off location.

The communication module 608C can include may comprise code or software, executable by the processor 604, for communicating. The communication module 608C may be configured or programmed to perform some or all of the functionality associated with receiving, sending, and generating electronic messages for transmission through the central server computer 102 to or from any of the devices shown in FIG. 1. When an electronic message is received by the central server computer 102 via the network interface 606, it may be passed to the communication module 608C. The communication module 608C, in conjunction with the processor 604, may identify and parse the relevant data based on a particular messaging protocol. The communication module 608C, in conjunction with the processor 604, may then transmit any received information to an appropriate module within the central server computer 102 (e.g., to the routing module 608A, the scoring module 608B, etc.). The communication module 608C may also receive information from one or more of the modules in the central server computer 102 and generate an electronic message in an appropriate data format in conformance with a transmission protocol so that the message may be sent to one or more devices within system 100. The electronic message may then be passed to the network interface 606 for transmission.

The network interface 606 may include an interface that can allow the server computer 600 to communicate with external computers. The network interface 606 may enable the server computer 600 to communicate data to and from another device (e.g., a transporter user device, a logistics platform, an end user device, etc.). Some examples of the network interface 606 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 606 may include Data transferred via the network interface 606 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 606 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 7:
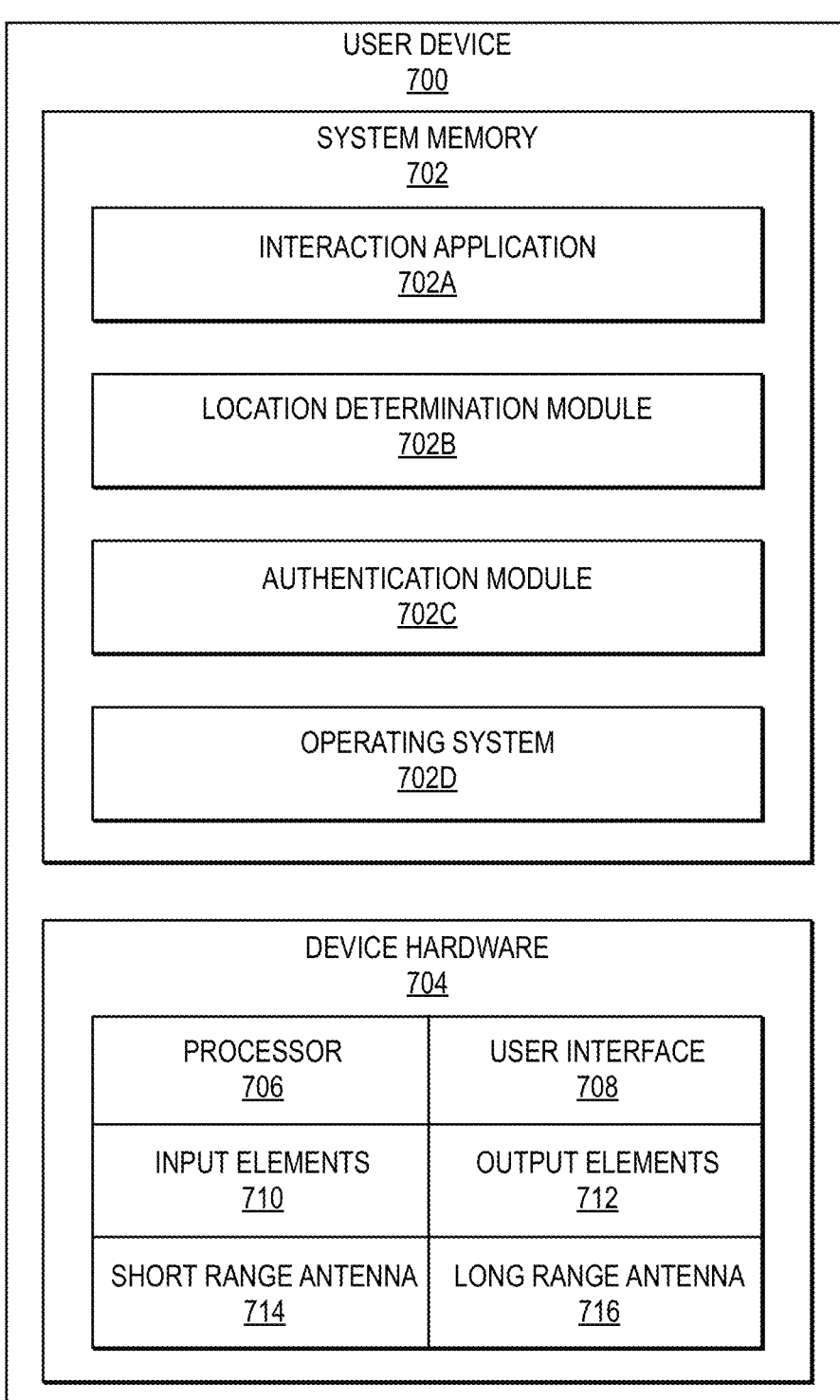
FIG. 7 a block diagram of a user device according to embodiments.

FIG. 7 a block diagram of a user device 700 according to embodiments. The user device 700 can be an end user device (e.g., the end user device 106) or a transporter user device (e.g., the transporter user device 114). The user device 700 may include device hardware 704 coupled to a system memory 702.

The device hardware 704 includes a processor 706, a short range antenna 714, a long range antenna 716, input elements 710, a user interface 708, and output elements 712 (which may be part of the user interface 708). Examples of input elements may include microphones, keypads, touchscreens, sensors, etc. Examples of output elements may include speakers, display screens, and tactile devices. The processor 706 can be implemented as one or more integrated circuits (e.g., one or more single core or multicore microprocessors and/or microcontrollers) and is used to control the operation of the user device 700. The processor 706 can execute a variety of programs in response to program code or computer-readable code stored in the system memory 702 and can maintain multiple concurrently executing programs or processes.

The long range antenna 716 may include one or more RF transceivers and/or connectors that can be used by the user device 700 to communicate with other devices and/or to connect with external networks. The user interface 708 can include any combination of input and output elements to allow a user to interact with and invoke the functionalities of the user device 700. The short range antenna 714 may be configured to communicate with external entities through a short range communication medium (e.g., using Bluetooth, Wi-Fi, infrared, NFC, etc.). The long range antenna 716 may be configured to communicate with a remote base station and a remote cellular or data network, over the air.

The system memory 702 can be implemented using any combination of any number of non-volatile memories (e.g., flash memory) and volatile memories (e.g., DRAM, SRAM), or any other non-transitory storage medium, or a combination thereof media. The system memory 702 may store computer code, executable by the processor 706, for performing accessing, by a transporter user device, a delivery platform that includes a set of optimal route plans from a central server computer; selecting, by the transporter user device, an optimal route plan of the set of optimal route plans; providing, by the transporter user device, an acceptance of the optimal route plan that indicates that a transporter of the transporter user device is to execute the optimal route plan; and notifying, by the transporter user device, the central server computer of progress of the transporter along the optimal route plan.

The system memory 702 may also store an interaction application 702A, a location determination module 702B, an authentication module 702C, and an operating system 702D. The interaction application 702A and the processor 706 may be a delivery application such as a food delivery application. The interaction application 702A can interact specifically with the central server computer 102, such that the central server computer 102 can be an application server computer. If the user device 700 is a transporter user device, then the interaction application may have code for performing the functions needed for the transporter to deliver the aggregates of items to the end users. The location determination module 702B and the processor 706 can be used to determine a location of the user device 700. The authentication module 702C may comprise code, executable by the processor 706, to authenticate a user. Authentication can be performed using user secrets (e.g., passwords) or user biometrics.

Embodiments provide for a number of technical advantages. End users need not leave their residence to complete different types of delivery orders, including return orders. End users can start a return order using their end user device without having to ship or deliver the item themselves. Embodiments leverage the efficiency opportunities across existing transporter fleets, such that the delivery order service can be maintained at a much higher efficiency than prior implementations.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a server computer, data relating to a first plurality of delivery orders for perishable food items from first service providers to first end users, and data relating to a second plurality of delivery orders from second end users to second service providers, wherein the first service providers are restaurants, wherein the data relating to the first plurality of delivery orders is received from delivery applications installed on one or more end user devices or a website accessed by the one or more end user devices over a communications network, wherein the first plurality of delivery orders comprise food delivery orders from the restaurants, and wherein the second plurality of delivery orders comprise return orders comprising non-perishable items;

determining, by the server computer, a first plurality of routes corresponding to the first plurality of delivery orders from the first service providers to the first end users;

determining, by the server computer, a second plurality of routes corresponding to the second end users to the second service providers;

generating, by the server computer, a plurality of order bundles comprising combinations of the first plurality of routes and the second plurality of routes;

scoring, by the server computer, each of the combinations of the routes using a composite scoring algorithm that determines a plurality of scores based on a first lateness score modified by a first force multiplier and a first delivery time score for a first route in the first plurality of routes, and a second lateness score modified by a second force multiplier and a second delivery time score for a second route in the second plurality of routes, wherein the first force multiplier is greater than the second force multiplier, wherein the first force multiplier is based on the an item being perishable and the second force multiplier is based on an item being non-perishable, and the first delivery time score is equal to a difference between a first calculated drop-off time at a first drop-off location and an estimated time that a transporter will arrive at the first drop-off location, and the first lateness score is equal to the first time delivery score multiplied by the first force multiplier, and the second delivery time score is equal to a difference between a second calculated drop-off time at a second drop-off location and an estimated time that the transporter will arrive at the second drop-off location, and the second lateness score is equal to the second delivery time score multiplied by the second force multiplier;

determining, by the server computer, a set of optimal route plans by selecting the combinations of the routes with the lowest scores;

receiving, by the server computer, acceptances from one or more transporters that will execute the set of optimal route plans;

routing, by the server computer, the transporters according to the set of optimal route plans, wherein the transporters are autonomous vehicles; and moving, by the autonomous vehicles, according to the routing according to the set of optimal route plans.

2. The method of claim 1, wherein the composite scoring algorithm comprises a first scoring algorithm that uses a first plurality of metrics to improve delivery efficiencies and a second scoring algorithm that uses a second plurality of metrics to improve return order efficiencies.

3. The method of claim 1, further comprising:

offering, by the server computer, to a first end user of the first end users, a greater discount on a first delivery order provided by a first service provider of the first service providers that is closer to a route corresponding to a return order associated with a second end user of the second end users, than a second delivery order provided by a second service provider that is further from the route corresponding to the return order.

4. The method of claim 1, wherein the data relating to the second plurality of delivery orders include delivery time ranges.

5. The method of claim 1, wherein the data of each of the second plurality of delivery orders comprises a pickup location and a drop-off location.

6. The method of claim 1, wherein the first plurality of delivery orders is received from the delivery applications installed on the one or more end user devices.

7. The method of claim 1, wherein facilitating the execution of the set of optimal route plans further comprises:

notifying, by the server computer, the one or more end user devices and/or one or more service provider computers associated with an optimal route plan associated with an acceptance by a transporter.

8. The method of claim 1, wherein the method further comprises:

tracking, by the server computer, progress of a transporter user device of a transporter that accepted an optimal route plan along the optimal route plan; and notifying, by the server computer, the one or more end user devices and/or one or more service provider computers associated with the optimal route plan of the progress.

9. The method claim 1, wherein the server computer comprises a processor and a computer readable medium, the computer readable medium comprising a routing module, a scoring module, and a communication module.

10. The method of claim 1, wherein the first end users and the second end users are the same users.

11. The method of claim 1, wherein the return orders are orders to return items from end users to the second service providers, the second service providers being retailers that sell the items.

12. The method of claim 1, wherein the autonomous vehicles are cars.

13. The method of claim 1, wherein the autonomous vehicles are drones.

14. A server computer comprising:

a processor; and a computer-readable medium coupled to the processor, the computer-readable medium comprising code executable by the processor for implementing a method comprising:

receiving data relating to a first plurality of delivery orders for perishable food items from first service providers to first end users, and data relating to a second plurality of delivery orders from second end users to second service providers, wherein the first service providers are restaurants, wherein the data relating to the first plurality of delivery orders is received from delivery applications installed on one or more end user devices or a website accessed by the one or more end user devices over a communications network, wherein the first plurality of delivery orders comprise food delivery orders from the restaurants, and wherein the second plurality of delivery orders comprise return orders comprising non-perishable items;

determining a first plurality of routes corresponding to the first plurality of delivery orders from the first service providers to the first end users;

determining a second plurality of routes corresponding to the second end users to the second service providers;

generating a plurality of order bundles comprising combinations of the first plurality of routes and the second plurality of routes;

scoring each of the combinations of the routes using a composite scoring algorithm that determines a plurality of scores based on a first lateness score modified by a first force multiplier and a first delivery time score for a first route in the first plurality of routes, and a second lateness score modified by a second force multiplier and a second delivery time score for a second route in the second plurality of routes, wherein the first force multiplier is greater than the second force multiplier, wherein the first force multiplier is based on the an item being perishable and the second force multiplier is based on an item being non-perishable, and the first delivery time score is equal to a difference between a first calculated drop-off time at a first drop-off location and an estimated time that a transporter will arrive at the first drop-off location, and the first lateness score is equal to the first time delivery score multiplied by the first force multiplier, and the second delivery time score is equal to a difference between a second calculated drop-off time at a second drop-off location and an estimated time that the transporter will arrive at the second drop-off location, and the second lateness score is equal to the second delivery time score multiplied by the second force multiplier;

determining a set of optimal route plans by selecting the combinations of the routes with the lowest scores;

receiving acceptances from one or more transporters that will execute the set of optimal route plans;

routing the transporters according to the set of optimal route plans, wherein the transporters are autonomous vehicles; and moving, by the autonomous vehicles, according to the routing according to the set of optimal route plans.

15. The server computer of claim 14, the method further comprises:

notifying the one or more end user devices and/or one or more service provider computers associated with an optimal route plan of an acceptance by a transporter;

tracking progress of a transporter user device of the transporter that accepted the optimal route plan along the optimal route plan; and notifying the one or more end user devices and/or the one or more service provider computers associated with the optimal route plan of the progress.

\* \* \* \* \*